No. 625,215. Patented May 16, 1899.
V. G. TICE.
BUTTER SHREDDER.
(Application filed Dec. 28, 1897.)
(No Model.)
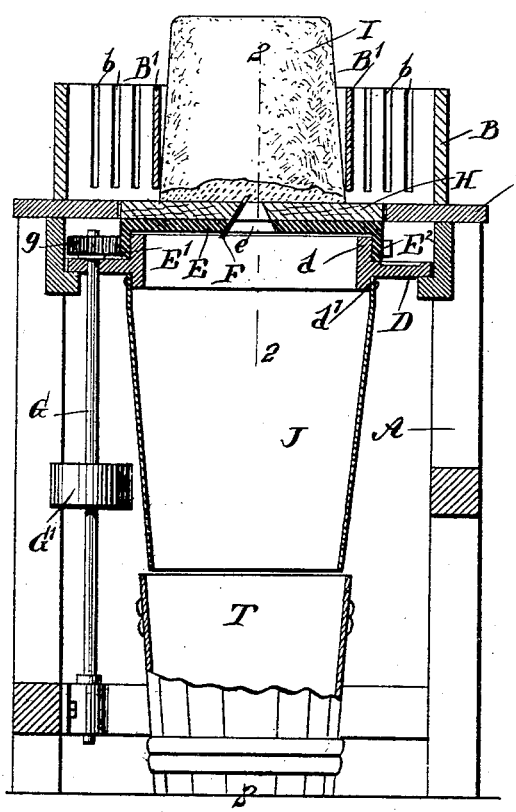
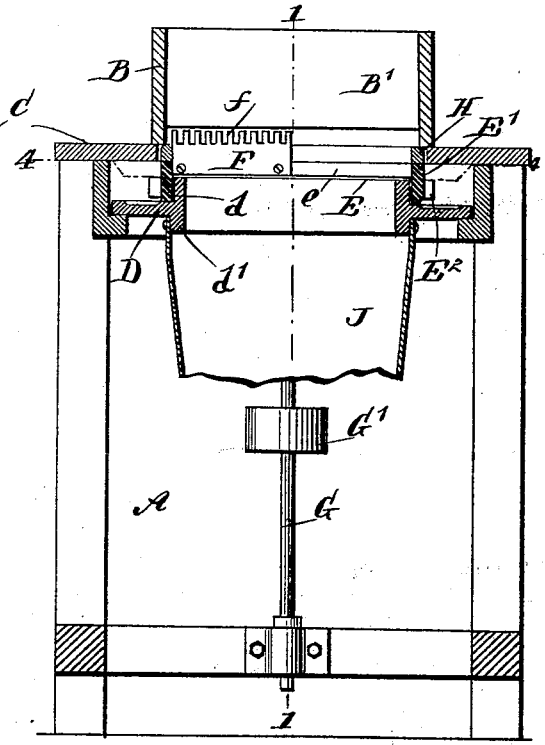
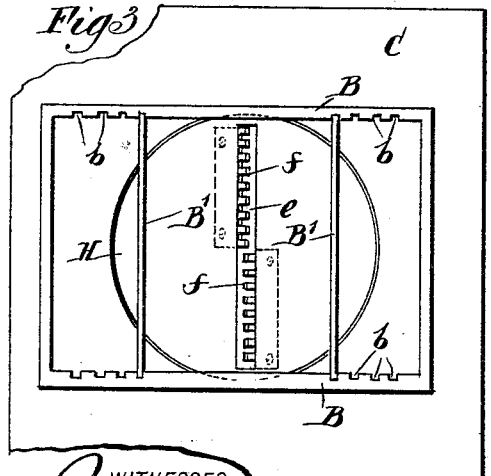
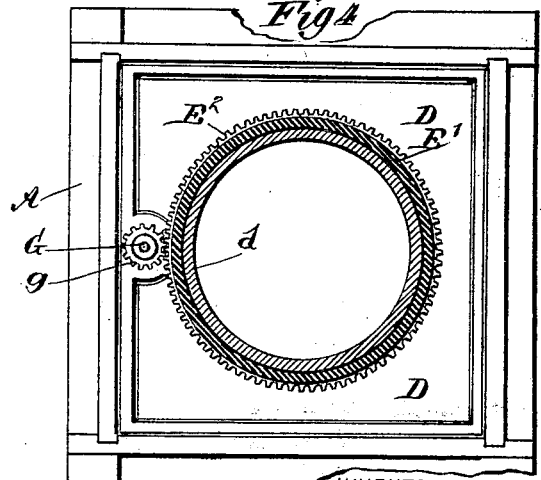
WITNESSES:
Paul Jokel
H. L. Reynolds
INVENTOR
V. G. Tice
BY
Munn
ATTORNEYS.
THE NORRIS PETERS CO., PHOTO-LITHO., WASHINGTON, D. C.

UNITED STATES PATENT OFFICE.

VALLIE G. TICE, OF SPRING CREEK, PENNSYLVANIA.

BUTTER-SHREDDER.

SPECIFICATION forming part of Letters Patent No. 625,215, dated May 16, 1899.

Application filed December 28, 1897. Serial No. 663,892. (No model.)

*To all whom it may concern:*

Be it known that I, VALLIE G. TICE, of Spring Creek, Lower Macungie township, in the county of Lehigh and State of Pennsylvania, have invented a new and Improved Butter-Shredder, of which the following is a full, clear, and exact description.

My invention relates to an improved mechanism for shredding or cutting butter and similar articles, and comprises a rotating disk having radial slots therein and one or more toothed knives therein upon which butter is placed and shredded by the rotation of the disk.

My invention comprises certain novel features, which will be hereinafter described and claimed.

Reference is to be had to the accompanying drawings, forming a part of this specification, in which similar characters of reference indicate corresponding parts in all the figures.

Figure 1 is a cross-sectional elevation of my device on the line 1 1 in Fig. 2 and showing a firkin of butter in place. Fig. 2 is a cross-sectional elevation taken upon the line 2 2 of Fig. 1. Fig. 3 is a top plan view. Fig. 4 is a sectional view taken upon the line 4 4 of Fig. 2, and Fig. 5 is a perspective showing one of the knives.

It is a common practice among dairymen, butter manufacturers, and dealers to place butter made during seasons of large production and unfavorable market conditions of demand and value and for other purposes in cold storage until demand and sale thereof are more favorable. This butter, originally packed into tubs, firkins, boxes, and similar large-sized packages, when placed upon the market is usually reduced in size and worked, molded, or pressed into small-sized packages of from one to five pounds.

To successfully work butter which has been in cold storage, it is necessary when ordinary means are used to raise the temperature thereof until it has become softened, so that it may be worked. The length of time required to raise the temperature of the butter injures the quality thereof, causing it to acquire, absorb, and develop objectionable flavor and taste, thereby deteriorating in value and causing it to bring a lower price than it would otherwise obtain. The object of my device is to so prepare this butter that it may be worked, molded, or pressed into prints or other small-sized packages without raising the temperature thereof. To obtain this result, the butter is cut or shredded into small narrow thin strips, so that it may be immediately worked, molded, or pressed into any form without raising the temperature.

My machine is constructed upon any suitably-shaped frame A, which has a top or cover C, provided with a central circular opening adapted to receive a rotating disk. This disk E is provided at its outer edge with a downwardly-extending flange E', said flange being provided with gear-teeth $E^2$. Upon the frame and beneath the cover C is placed a plate D, preferably of cast-iron, which is provided with an upwardly-extending circular flange $d$, adapted to fit snugly within the flange E' of the disk E and to form a journal, upon which the disk may rotate.

Mounted in the plate D and upon the frame A is a vertical shaft G, provided with a pulley G' or any other suitable means by which it may be rotated and at its upper end having a pinion $g$ engaging the teeth $E^2$ upon the disk E. By this means the disk is given a rotary movement. This disk is provided with radial slots $e$. As shown in the drawings, this is a diametrical slot extending substantially all the way across the disk. This construction may, however, be varied so as to increase the number of slots, if desired. The inner walls of this slot are sloping, as shown in Fig. 1, and have the cutting-blades F secured thereto, with their upper edges projecting above the upper surface of the disk. A layer H of wood is secured to the upper surface of the disk in order to provide a more suitable surface for the reception of the butter than iron would be. The cutting blades or knives F have their upper or cutting edges toothed, as clearly shown in Fig. 5, the teeth $f$ being of substantially the same width as the space between the teeth. The ends of these teeth project slightly above the upper surface of the wooden disk H. This disk H rotates with the iron disk E.

The two knives F are placed on opposite sides of the center and are so arranged that the teeth of one correspond in location with the spaces of the other, so that as the disk rotates beneath the firkin of butter strips will be taken from the bottom of the firkin by one knife, and the other knife when it comes around will take out the ribs which have been left by the spaces in the other knife. This reduces the butter into narrow shavings or strips which are of such size that they may be readily worked and molded at a low temperature. In practice I have found that one of these knives may be made plain or without teeth, in which case it removes the ridges left by the toothed knife.

To hold the firkin of butter in place, a frame B is provided. This, as shown in the drawings, consists of a rectangular box or frame without top or bottom and provided with a series of vertical grooves $b$ in two opposite sides. Boards B' are provided, which are adapted to slide into these grooves and be held thereby. The grooves $b$ terminate short of the bottom of the frame, so that the boards B' are held at a sufficient distance above the table C to prevent engagement of the knives therewith.

In using this device the butter is placed upon the rotating disk E, and the boards B' are adjusted in the frame in such position that they will engage the sides of the butter and prevent its rotation. As the disks and knives carried thereby are rotated they gradually pare the butter down, leaving it in narrow shavings. These drop through the slot $e$ in the disk and into the tub or other receptacle T, placed beneath the same. To prevent the butter from being thrown out to one side, a canvas or other suitable chute J is provided. This is attached at its upper end to a downward extension $d'$ of the flange $d$. It extends downward a sufficient distance so as to enter the tub T or to terminate just above it, so as to direct the shredded butter into the tub.

By cutting the butter up into small shavings in the manner described it may be readily worked, molded, or pressed into prints or any other form of package at any ordinary temperature. As it is not necessary to raise the temperature of the butter in order to work it into prints or any other form of package, neither the quality, flavor, nor the grain of the butter is impaired.

Although this device has been especially designed and described for shredding butter, it is evident that it may be used for shredding or similarly cutting cheese and other similar articles.

Having thus described my invention, I claim as new and desire to secure by Letters Patent—

1. A butter-shredder, comprising a supporting-frame having a central opening, a disk supported at its periphery in said opening and provided with means engaging the periphery to rotate it, whereby the central portion of the disk will be unobstructed, said disk having slots extending to its center, and cutters mounted in said slots, substantially as described.

2. A butter-shredder, comprising a frame having an opening therein, a plate below the opening of the frame and having a central opening, a disk supported at its periphery on the plate to rotate thereon in the opening of the frame, said disk having radial slots extending from near the periphery to the center and provided with gear-teeth on its periphery, a shaft provided with a pinion meshing with the teeth of the disk, a toothed cutter in one of the slots for cutting strips from the bottom of the whole mass of butter, and a cutter in the other slot for cutting off the ribs on the mass of butter left by the first cutter, substantially as described.

3. A shredder for butter and the like, comprising a disk having a downwardly-projecting annular flange, cutters carried by said disk, a frame having a central opening and provided with a flange on each side around the said opening, the upper flange fitting within the flange of the disk, a chute secured to the lower flange, and means for revolving the disk, substantially as described.

4. A butter-shredder, comprising a frame, a plate carried by the frame and having a central opening and an upwardly-projecting flange around said opening, a disk having a slot extending nearly to the periphery thereof and provided with a downwardly-projecting flange within which the flange of the plate fits, the said disk being provided with gear-teeth on the outer face of its flange, a shaft provided with a pinion meshing with the teeth of the disk, and toothed cutters in the slot of the disk, the inner ends of the cutters being adjacent to each other, substantially as herein shown and described.

VALLIE G. TICE.

Witnesses:
STEPHEN ACKER,
SADIE H. ACKER.